United States Patent [19]

Gallegos, Jr. et al.

[11] Patent Number: 4,725,827

[45] Date of Patent: Feb. 16, 1988

[54] HAND HELD REMOTE CONTROL DEVICE

[75] Inventors: David M. Gallegos, Jr., Petalum; Paul F. Wilkinson, Burlingame, both of Calif.

[73] Assignee: Pulsar Manufacturing, Inc., Burlingame, Calif.

[21] Appl. No.: 877,162

[22] Filed: Jun. 23, 1986

[51] Int. Cl.[4] .............................................. H04Q 9/14

[52] U.S. Cl. .................................... 340/696; 455/95; 455/100

[58] Field of Search ................ 340/696; 455/100, 129, 455/128, 95; 343/718

[56] References Cited

U.S. PATENT DOCUMENTS 3,134,075 5/1964 Langevin ........................... 455/128

*Primary Examiner*—Glen R. Swann, III

*Attorney, Agent, or Firm*—Ernest M. Anderson

[57] ABSTRACT

A hand held remote control device having enhanced range capability includes a radio transmitter for transmitting encoded signals at a frequency between 1 MHz to 1 GHz, a battery and switch for energizing the transmitter, means for encoding and transmitting signals, and a housing, the improvement wherein said transmitter includes an open loop antenna connected to a conductive object that is exposed to the operator's touch on the outside of the housing.

6 Claims, 5 Drawing Figures

HAND HELD REMOTE CONTROL DEVICE

BACKGROUND OF THE INVENTION

This invention relates generally to hand held remote control devices and particularly devices that include transmitters that may be operated by battery on low voltages. Devices of this kind are utilized in connection with security alarms and systems for remotely arming and disarming a controlled security device as within a car.

The invention more especially involves the use of a human body as an antenna to more effectively broadcast at substantially greater distances than the prior art devices are presently capable. The use of a human body as an antenna is known in connection with directional antennae for receivers and is described in U.S. Pat. No. 2,353,053. A body-coupled radio transmitter is also disclosed in U.S. Pat. No. 3,902,118; and the human body has been used to provide capacitance in a transmitter circuit as disclosed in U.S. Pat. No. 3,983,483. However, use of the human body as part of an open loop antenna for a small portable transmitter is believed to be novel. Moreover, use of the human body as part of an open loop antenna for hand held transmitters, which use relatively unstable oscillators, is impractical.

SUMMARY OF THE INVENTION

In brief, the present invention teaches a hand held remote control device with enhanced range capability having a transmitter for transmitting encoded signals in a frequency from 1 MHz to 1 GHz. The transmitter is energized by a battery and a pair of control switches which operate in a control panel for encoding signals. The transmitter, battery and control switches are all contained within the housing. Importantly, the transmitter includes an open loop antenna connected to a conductive object on the outside of the housing that is exposed to the operator's touch. Thus, contact of the conductive object by an operator makes the human body part of the antenna to substantially increase the range of transmission.

This invention further comtemplates using a key ring as part of the open loop antenna. The number of keys affixed to the key ring will also add to the strength of transmission and enhance the range of operation.

In view of the foregoing, it will be understood that a principal object of the present invention is to provide a hand held remote control device having enhanced range capability and wherein means is provided for using the human body as part of an open loop antenna for a transmitter.

A further object is to provide a remote control device having a transmitter of the kind described wherein the antenna is formed as part of a printed circuit board connected to a conductive object that is exposed to touch on the outside of a housing.

A still further object of the invention is to provide a hand held remote control device including a key ring which serves as part of the open loop antenna of a transmitter.

Other objects of the invention will become apparent in view of the following detailed description.

BRIEF DESCRIPTION OF THE DRAWINGS

In the drawings forming a part of this application and in which like parts are identified by like reference numerals.

DESCRIPTION OF THE PREFERRED EMBODIMENT

Figure 1A:
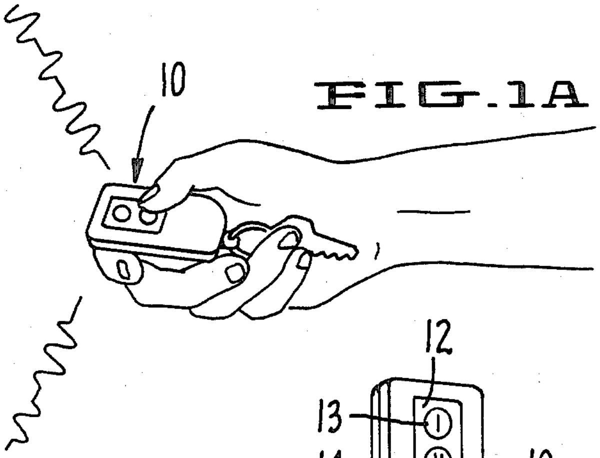
FIG. 1A is a perspective view of the control device as held for operation.
Figure 1:
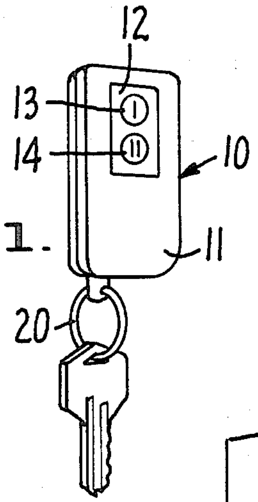
FIG. 1 is a perspective view of a preferred embodiment of the invention in a hand held remote control device.
Figure 3:
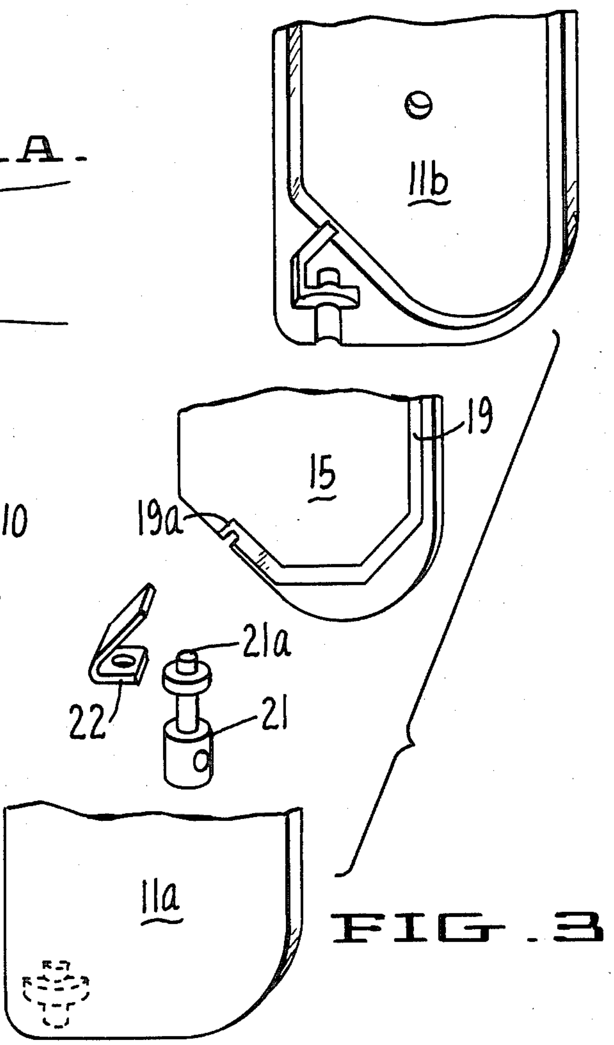
FIG. 3 is an exploded view of fragmented parts of the housing, circuit board and key swivel.
Figure 2:
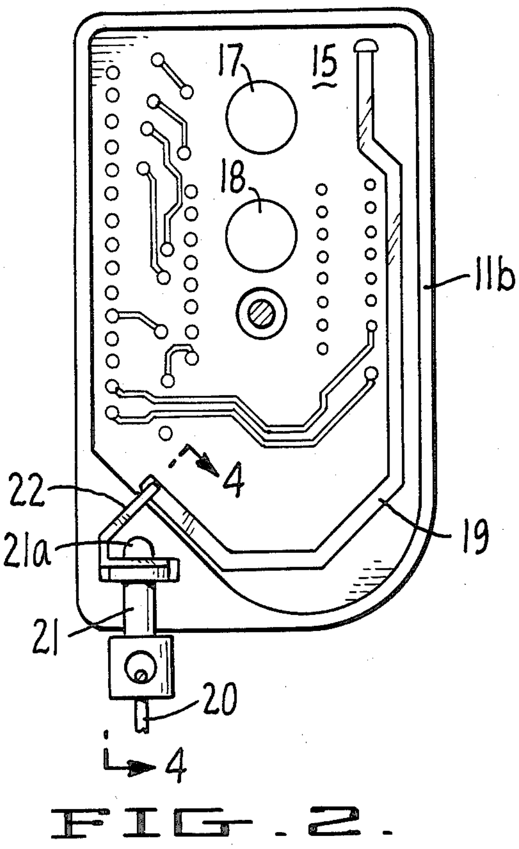
FIG. 2 is a plan view of the control device with cover removed.
Figure 4:
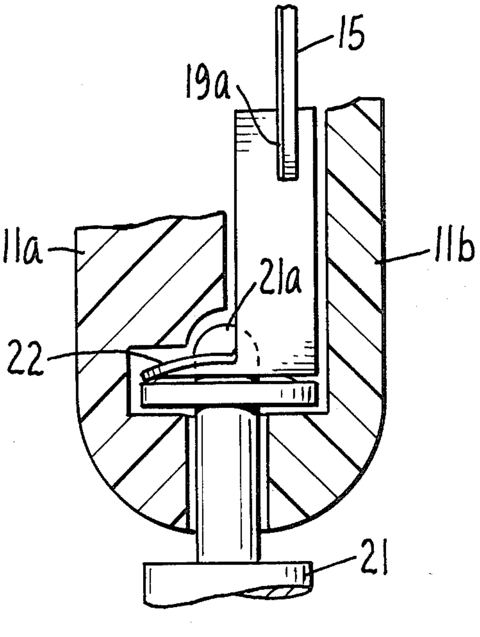
FIG. 4 is an enlarged detail and section taken on the broken line 4—4 of FIG. 2.

Referring to the drawings there is illustrated a hand held remote control device 10 comprising a housing 11 and a control panel 12 having a pair of buttons 13 and 14 for encoding and transmitting signals. Housing 11 essentially comprises a two piece assembly 11*a* and 11*b* and contains a printed circuit board 15 to which is mounted a radio transmitter and a battery (not shown) and a pair of switches 17 and 18 which ar operated by buttons 13 and 14 to encode and transmit signals. An open loop antenna 19 mounted to the circuit board and connected to the transmitter extends partially around the board. Antenna 19 a free end 19*a* that terminates in a slot formed in the side edge of the board. A key ring 20 connects to the free end 19*a* through a swivel member 21 and a spring clip 22. One end of clip 22 is engaged with the free end 19*a*, the other end of the clip having an opening that receives the button end 21*a* of swivel 21.

The use of the human body as part of the antenna necessitates that a transmitter be utilized that has an output frequency which will not be significantly affected by variations in antenna impedance. Modulated hybrid transmitters are particularly suited for use with this invention. Such transmitters modulated from any encoder IC with a data clock rate of up to 50 kHz are preferred. The oscillator frequency may be stabilized by a quartz SAW (surface acoustic wave) resonator, which assures that the transmitter will not be significantly affected by variations in supply voltage, temperature or antenna impedance.

Although a preferred embodiment of the invention has been illustrated and described, various modifications and changes may be resorted to without departing from the spririt of the invention or the scope of the appended claims, and each of said modifications and changes is contemplated.

What is claimed is:

1. In a hand held remote control device with enhanced range capability having a radio transmitter for transmitting encoded signals at a frequency between 1 MHz to 1 GHz, a battery and switch for energizing said transmitter, means connected to said transmitter for encoding and transmitting signals, and a housing, the improvement wherein said transmitter includes an open loop antenna connected to a conductive object that is exposed to touch on the outside of said housing.

2. The remote control device of claim 1, said transmitter being stabilized by a quartz SAW resonator.

3. The remote control device of claim 1, said antenna being formed as part of a printed circuit board and extending from the transmitter to a free end that terminates at a side edge, and a conductive connector interconnecting said free end with said conductive object.

4. The remote control device of claim 1, 2 or 3, said conductive object comprising a key ring attached to said housing.

5. The remote control device of claim 4, and means for swivel mounting said key ring to said housing.

6. The remote control device of claim 3, said printed circuit board being formed with a slot that connects with the free end of said antenna, said conductive object comprising a swivel mounted in the side of said housing and having a button on one end, said conductive connector comprising a spring clip, one end of said clip engaged with the slot of said printed circuit board, the other end of said clip being formed with a collar that receives the button of said swivel.

* * * * *